May 16, 1933.   G. W. CURTIS   1,909,525
ROLLER BEARING
Filed March 21, 1931   2 Sheets-Sheet 2

INVENTOR
George W. Curtis,
by Carr & Carr & Gravely
HIS ATTORNEYS

Patented May 16, 1933

1,909,525

UNITED STATES PATENT OFFICE

GEORGE W. CURTIS, OF MILWAUKEE, WISCONSIN, ASSIGNOR TO THE TIMKEN ROLLER BEARING COMPANY, OF CANTON, OHIO, A CORPORATION OF OHIO

ROLLER BEARING

Application filed March 21, 1931. Serial No. 524,275.

My invention relates to roller bearings, particularly to double row conical roller bearings and has for its principal object to improve and simplify the process of assembling said roller bearings and to improve the lubrication of such bearings. The invention consists in the roller bearing and process of assembling the same, and in the parts and combinations and arrangements of parts hereinafter described and claimed.

In the accompanying drawings.

Figure 1:
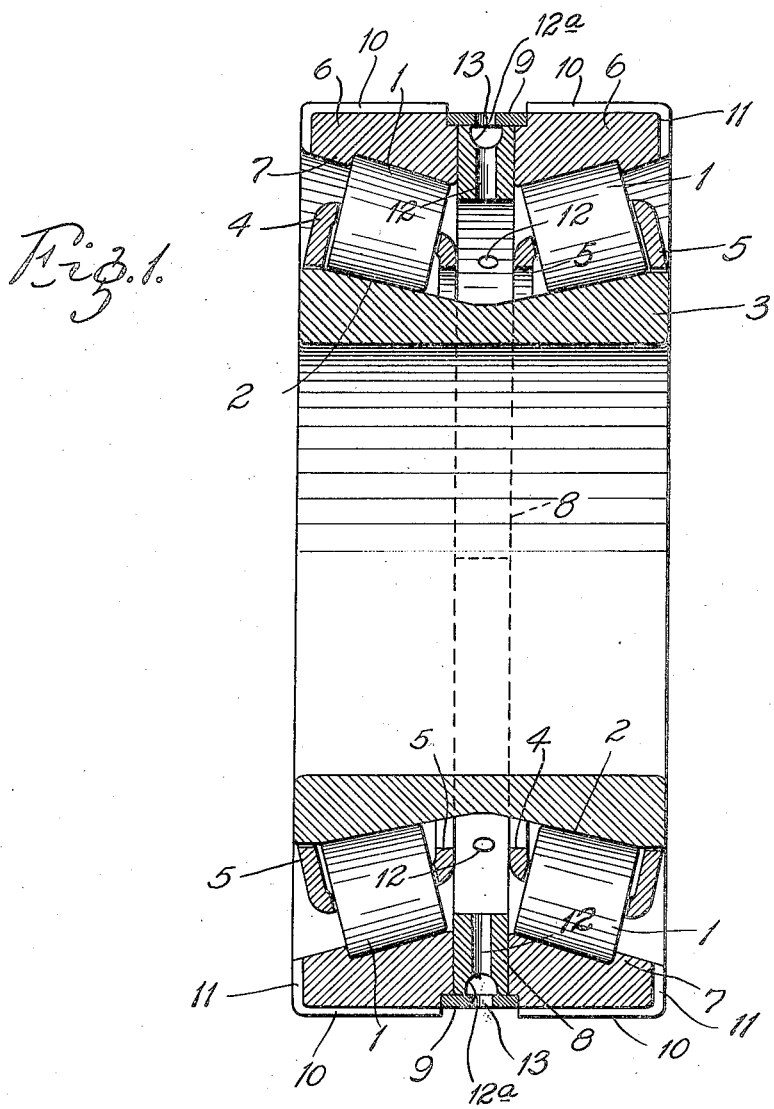
Fig. 1 is a sectional view of a roller bearing embodying my invention.

The drawings illustrate a double row roller bearing in which two series of conical rollers 1 having their small ends directed towards each other are mounted on conical raceways 2 of a cone or inner bearing member 3, said raceways tapering toward the middle of said cone. The rollers 1 are held in position by means of cages 4 having end flanges 5. The inner diameter of the end flange 5 at the small end of the rollers is large enough to permit it to be slipped over the large end of the cone 3.

Separate cups or outer bearing members 6 are provided for the two series of rollers 1, each cup having a thrust rib 7 engaging the large ends of the rolls 1. Interposed between the adjacent ends of said rollers is a two-part ring 8 that is ground to the proper thickness for spacing the bearing cups 6 the correct distance apart. Said two-part ring 8 is held together by means of a one-piece snap ring 9, or by welding the two parts of the ring together.

In a conical roller bearing, there is a pumping action that pumps lubricant toward the large ends of the rollers; and because of the difficulty of maintaining a supply of lubricant at the middle of a double row bearing, it has been the practice to dispose the rollers of such bearings with their large ends toward the middle of the bearing, although it has been known to be desirable in some bearing installations to have the small ends of the rollers disposed toward each other.

In order to provide a supply of lubricant between the two series of rollers of such a bearing, each cup 6 is provided according to the present invention, with grooves or channels 10 in its outer periphery extending parallel to the axis of the bearing, as shown, or helically around the periphery, said grooves communicating with radial grooves 11 in the end faces of the cup 6. The spacer ring 8 is provided with a multiplicity of openings 12 therethrough and a groove 12a around its outer periphery connecting said openings and the snap ring 9 (if one is used) likewise has openings 13 that communicate with the openings 12 through the spacer ring. By this arrangement, oil that is pumped to the large ends of the rollers passes radially outward and then is free to work its way through the grooves in the cup and through the holes in the spacer ring into the space between the small ends of the rollers. Thus a supply of lubricant is provided at the middle of the bearing and the rollers are kept lubricated.

Figure 2:
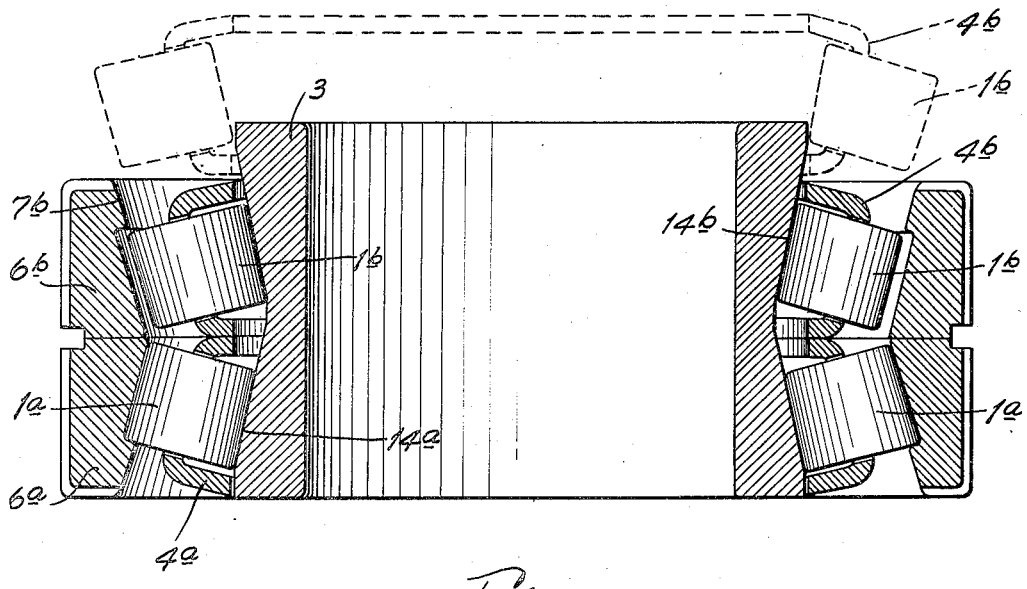
Figs. 2 and 3 are similar views showing the preferred process of assembling said bearing.
Figure 3:
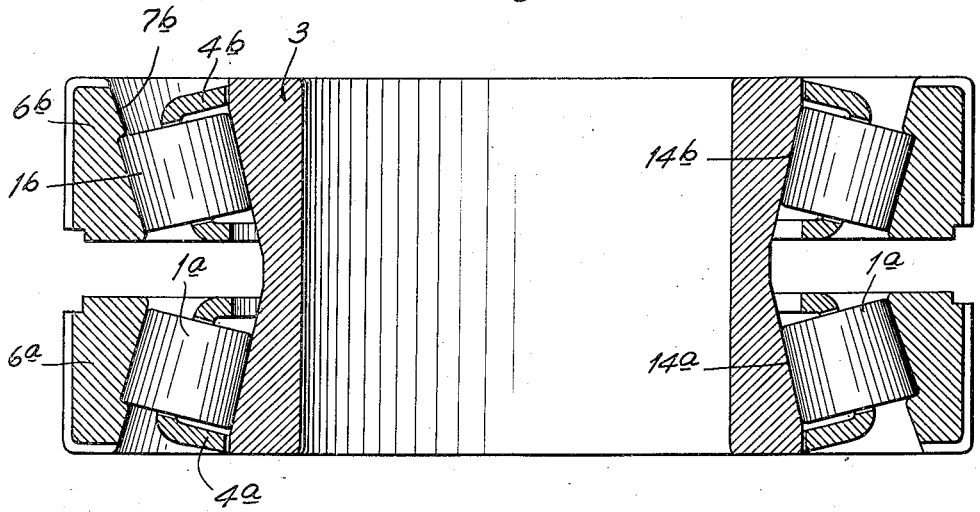

The preferred process of assembling said bearing as illustrated in Figs. 2 and 3 is as follows: The double cone or inner bearing member 3 is placed on its side and one set of rollers 1a, with their cage 4a and cup 6a are placed in position, said rollers being mounted on the raceway 14a. The second cup or outer bearing member 6b is then positioned against the first cup 6a, thus permitting the second set of rollers 1b with their cage 4b to pass over the raceway 14b past the rib 7b of the cup from the dotted line position and into the full line position shown in Fig. 2. After the second set of rollers 1b is in place, the cup 6b is moved away from the cup 6a so that the cup 6b, the rollers 1b and cage 4b assume the position shown in Fig. 3, after which the spacer ring 8 and the snap ring 9 are placed in position to hold the parts in proper relation to each other.

The above described construction has the important advantage of providing proper lubrication for the rollers of a double row bearing in which the small ends of the rollers are disposed inwardly of the bearing.

A one-piece outer bearing member may be substituted for the construction illustrated, said one-piece member having radial and longitudinal passageways, and other changes may be made without departing from the invention and I do not wish to be limited to the precise construction shown.

What I claim is:

1. A double row conical roller bearing comprising two series of conical rollers disposed with their small ends toward each other, an inner bearing for said rolers, spaced outer bearing members for said rollers, and a spacer ring between said outer bearing members, said spacer ring having passageways therethrough, and said outer bearing members having longitudinal passageways in their outer surface whereby lubricant pumped to the outer ends of said bearing may be returned to the middle of the bearing.

2. A double row conical roller bearing comprising two series of conical rollers disposed with their small ends toward each other, an inner bearing for said rollers, spaced outer bearing members for said rollers, and a spacer ring betwen said outer bearing members, said spacer ring having passageways around and therethrough, and said outer bearing members having longitudinal passageways in their outer surfaces and radial grooves on their ends communicating with said longitudinal passageways whereby lubricant pumped to the outer ends of said bearing may be returned to the middle of the bearing.

3. A double row conical roller bearing comprising two series of conical rollers disposed with their small ends toward each other, an inner bearing for said rollers, spaced outer bearing members for said rollers, a split spacer ring between said outer bearing members, and a spring clamp ring extending around said split ring, said spacer ring having passageways around and therethrough, said clamp ring having openings therein and said outer bearing members having longitudinal passageways in their outer surfaces and radial grooves on their ends communicating with said longitudinal passageways whereby lubricant pumped to the outer ends of said bearing may be returned to the middle of the bearing.

Signed at Milwaukee, Wisconsin, this 2nd day of March, 1931.

GEORGE W. CURTIS.